Oct. 10, 1961   H. L. WEISS   3,004,175
PORTABLE POWER SYSTEM
Filed Aug. 4, 1958   3 Sheets-Sheet 1
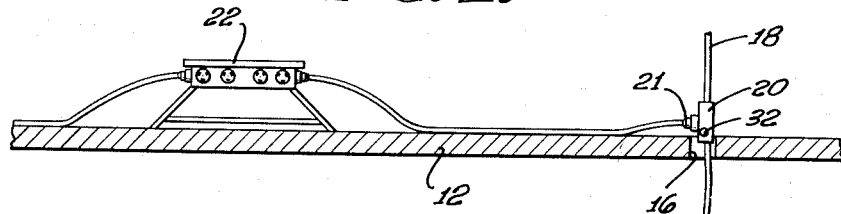
FIG. 1.
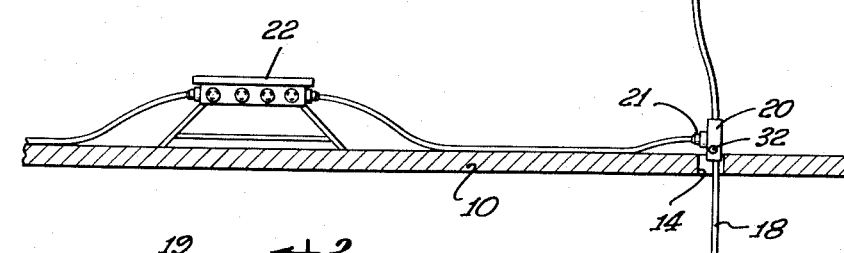
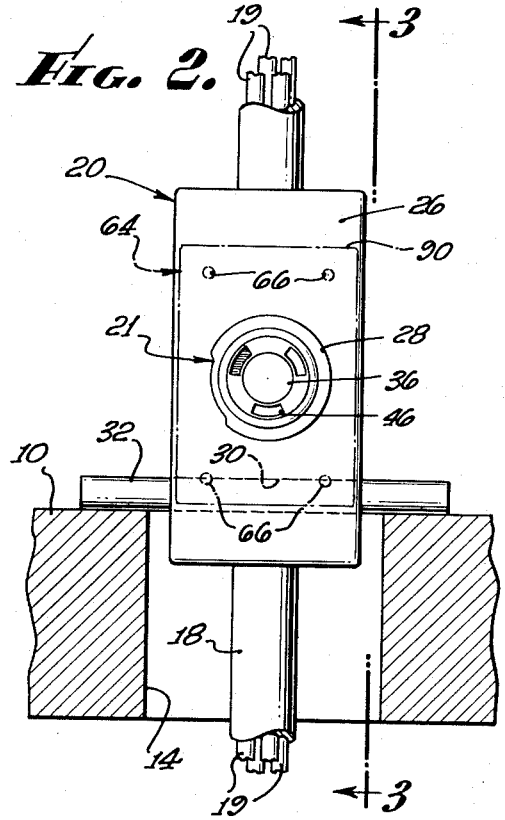
FIG. 2.
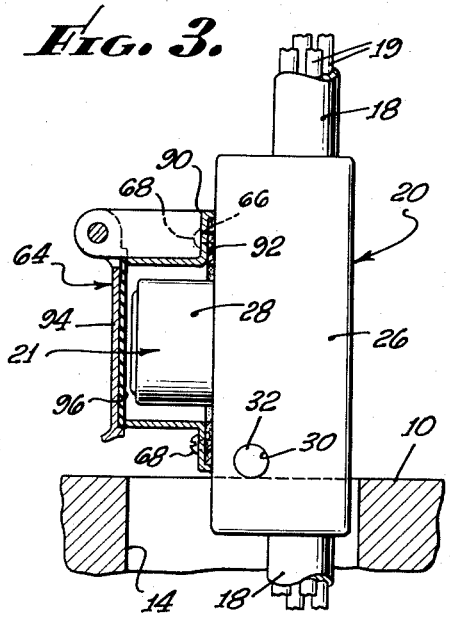
FIG. 3.
INVENTOR.
HUBERT L. WEISS
BY Flam and Flam
ATTORNEYS.

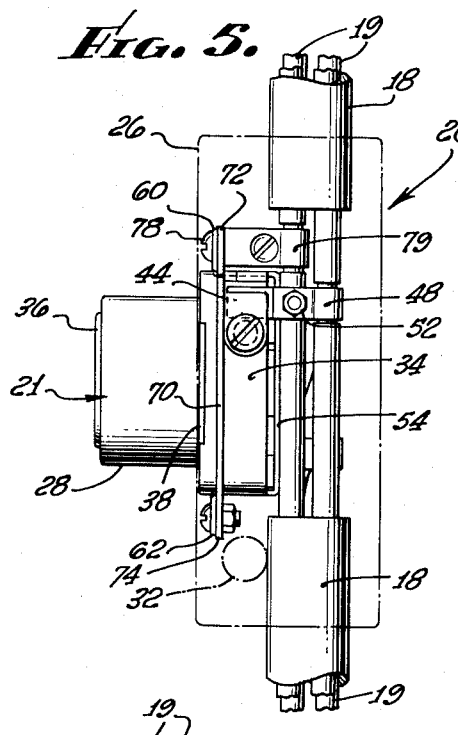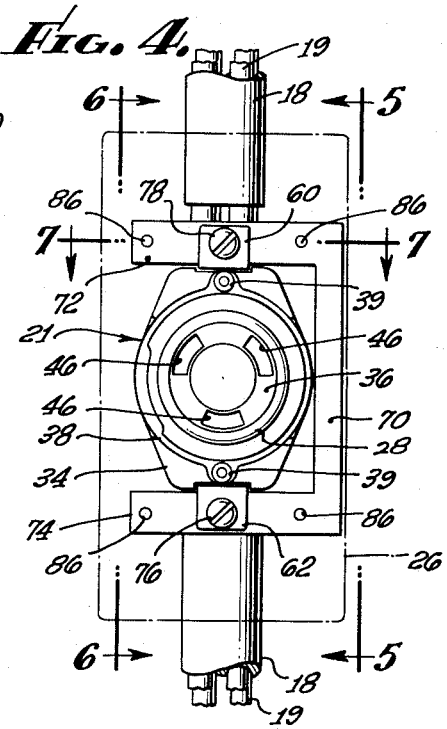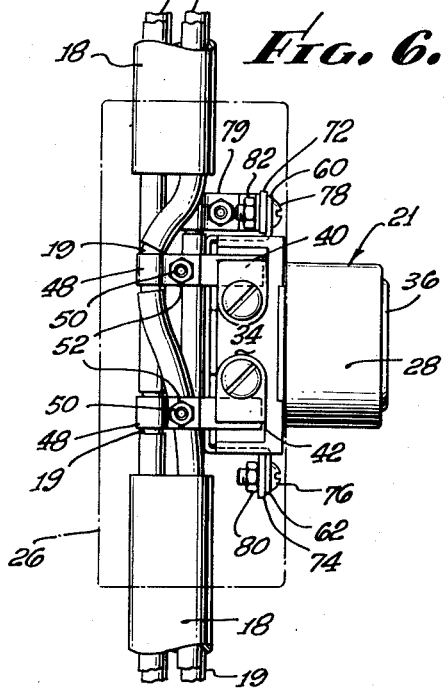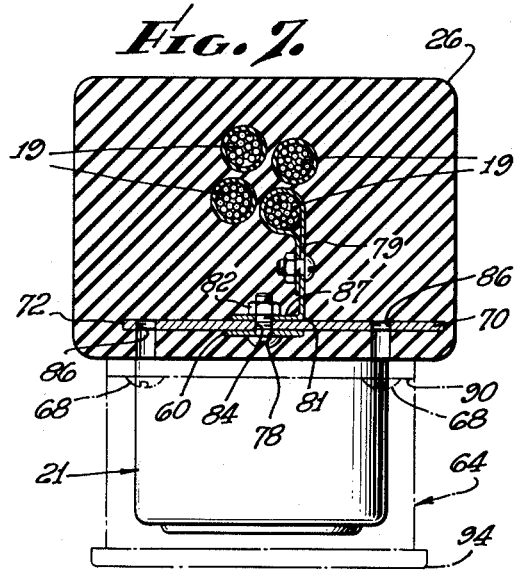

Oct. 10, 1961 H. L. WEISS 3,004,175
PORTABLE POWER SYSTEM
Filed Aug. 4, 1958 3 Sheets-Sheet 3

INVENTOR.
HUBERT L. WEISS
BY
Flam and Flam
ATTORNEYS.

United States Patent Office 3,004,175
Patented Oct. 10, 1961

3,004,175
PORTABLE POWER SYSTEM
Hubert L. Weiss, % American Construction Equipment Co., Inc., 5055 W. Jefferson Blvd., Los Angeles 16, Calif.
Filed Aug. 4, 1958, Ser. No. 752,811
2 Claims. (Cl. 307—147)

This invention relates to temporary power installations, such as used in connection with construction jobs. In my prior application Serial No. 447,517, filed August 3, 1954, and entitled Electric Power Distribution System, now abandoned, temporary power tables are serially connected together, power cables cooperating with detachable prong connectors affixed to each table. Each table is provided with several overload protected takeoffs. These tables have been favorably received, and are used widely in tract housing projects. Power is made available to a number of different houses under construction within a single tract by the aid of only one connection to power lines. Temporary connections to each house in the tract are avoided.

There has been a substantial problem in providing temporary power for multiple-story dwellings, multiple-story office buildings, or the like. Tables of the type disclosed and claimed in said applications have been used on such jobs with some measure of success. Thus, tables are serially connected in serpentine fashion from floor to floor. The overall system was, nevertheless, more satisfactory than providing separate temporary power for each and every floor for a multiple-story building.

The primary object of this invention is to make possible a very simple and effective temporary power installation for multiple-story buildings or the like. For this purpose, there is provided a riser cable having means for branch takeoff at spaced intervals for each floor. A table system can then be used at each floor.

Another object of this invention is to provide a simple device of this character which incorporates effective measures of weather protection.

Another object of this invention is to provide simple structural arrangements for facilitating connections of the branch takeoffs to a main cable.

Another object of this invention is to provide an improved encapsulated socket structure that incorporates simple parts, facilitating connection of a protective cover.

Another object of this invention is to provide a simple device of this character which, in a common encapsulating casing, includes a resettable overload protection device.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic view illustrating the use of a riser cable incorporating the present invention;

FIG. 2 is an enlarged front elevation of one of the connectors of the riser cable, the floor being illustrated in section;

FIG. 3 is a sectional view, taken along the plane indicated by line 3—3 of FIG. 2;

FIG. 4 is a front elevation of the connector structure, the encapsulating material being illustrated only by phantom lines in order clearly to show the embedded bracket structure which facilitates attachment of a protective cover for the connector;

FIG. 5 is a side elevation, taken along the plane indicated by line 5—5 of FIG. 4;

FIG. 6 is a side elevation, taken along the plane indicated by line 6—6 of FIG. 4;

FIG. 7 is an enlarged transverse sectional view, taken along the plane indicated by line 7—7 of FIG. 4;

Figure 8:
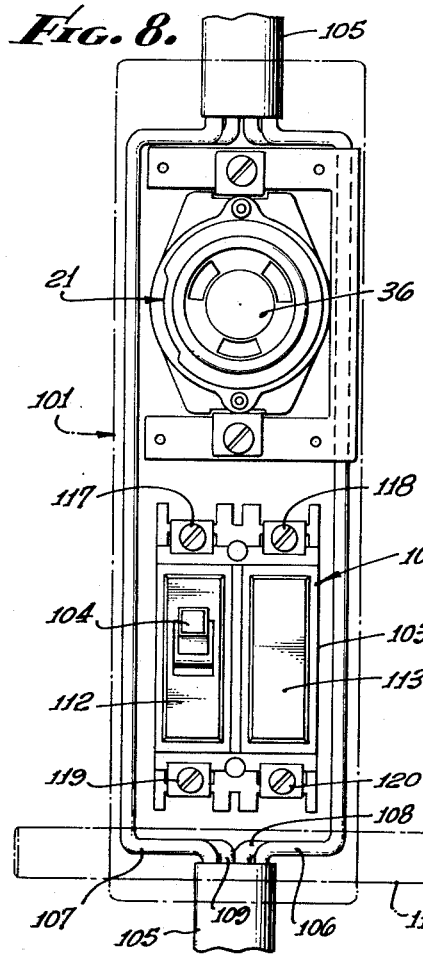
FIG. 8 is a partially diagrammatic view similar to FIG. 4, but illustrating a modified structure that incorporates an overload protection device.

In FIG. 1, there are illustrated diagrammatically successive floors 10 and 12 of a multiple-story building in the process of construction. Through substantially aligned openings 14 and 16 in the successive floors 10 and 12, a riser cable 18 vertically passes. Spaced at intervals along the riser cable 18 are takeoff connectors 20.

Four conductors 19, one of which is a ground or common return, are included in the cable 18. The conductors 19 are connected at the end of the cable to power lines. Power is made available at each floor by the aid of the connectors 20. Serially connected power distribution tables 22 for each floor cooperate with a corresponding connector 20.

Each connector structure includes a socket 21 (FIGS. 5, 6 and 7) and a rubber or similar housing 26 (FIG. 2) encapsulating the socket. Only a shell 28 (FIG. 5), the socket head 36 which it surrounds, and the cable 18 project from the encapsulating housing 26.

Extending through the housing 26 and at an end thereof, is a transverse through opening 30 (FIGS. 2 and 3) that serves as a means for locating the connector at the floor level. For this purpose, any implement such as a rod 32 is passed through the through opening 30. The rod or bar 32 is of sufficient dimension to provide an abutment against downward passage of the riser cable 18 at the area of the opening 14. The connector 20 is accordingly located conveniently at the floor level. If desired, the connector 20 can be located at any other convenient level, for example, by utilizing any structure providing an opening against which a rod such as 32 may rest. In order to ensure that successive connectors 20 are similarly located at the floor level or otherwise, and in order to compensate for different floor-to-floor spacings, the distance between successive sockets 20 along the cable 18 exceeds the maximum contemplated floor-to-floor spacing. The slack in the cables also ensures that the cable can clear obstacles, such as beams, and that the cable can be strung between offset openings in successive floors, if necessary.

The socket 21 illustrated in FIGS. 4, 5 and 6 is a standard part. Without modifying the socket, it is adapted for use with the encapsulating housing 26 and the cable 18. The socket includes a base 34 of insulation material from which the socket head 36 extends. The shell 28 has a base flange 38 (FIGS. 4 and 5) by the aid of which it is secured, as by rivets 39, to the insulation base 34. On one side of the base 34 (FIG. 6) there are provided two terminal screw-clamp assemblies 40 and 42, and on the other side (FIG. 5) a third terminal screw-clamp assembly 44. Appropriate internal connections are provided between the terminals 40, 42 and 44 and the elements accommodated within the apertures 46 of the head 36 (FIG. 4).

In order to facilitate connections between the conductors 19 of the cable 18 and the usual terminal clamps 40, 42 and 44, special connector clamps 48 (FIGS. 5 and 6) are provided. Each connector clamp 48 has an end that is readily positioned beneath the terminal clamp. The other end of each clamp 48 is returned to form a seat for the corresponding conductor 19. A bolt 50 and nut 52 constrict the seat so that it firmly engages the conductor. Thus, an electrical as well as a mechanical connection is established between the socket 21 and the conductors 19. The seat is readily placed in encompassing relationship with respect to the bared conductor by first removing the nut 52 and bolt 50. It is thus unnecessary physically to cut the conductors to provide the connections.

Ears 60 and 62 of a U-bracket forming a part of the socket 21 in the usual case serve as a means for securing the socket to a metal box. By the aid of a bracket 70 cooperating with the ears 60 and 62, a standard socket cover 64 (FIG. 3) is mounted on the encapsulating housing 26.

The cover 64 has four rectangularly arranged apertures 66 (FIGS. 2 and 3) at its base flange 90. Screws 68 pass through the apertures 66 and engage holes 86 (FIG. 4) provided by the bracket 70. The bracket 70 has arms 72 and 74, the central portions of which are placed behind the ears 60 and 62. Machine screws 76 and 78 (FIGS. 4 and 7) and nuts 80 and 82 (see also FIG. 6) pass through apertures 84 (FIG. 7) formed centrally of the bracket arms 72 and 74.

The unitary structure of the bracket 70 ensures that, for some orientations of the cover 64, the apertures 66 of the cover all register respectively with the apertures 86 of the bracket 70. This is true as long as the plane of the bracket 70 is parallel or substantially parallel to the surface of the encapsulating housing 26 against which the cover flange 90 is placed. The socket ears 60 and 62 extend normal to the axis of the head 36, and determine a corresponding orientation of the plane of the bracket 70. If the head 36 is normal to the surface of the housing 26, the bracket 70 will then be parallel thereto.

It is also important that the bracket 70 be centered at the head 36 and maintained at one angular position with respect thereto if the bracket apertures 86 are to be located for the cover. Angular movement of the bracket 70 as a whole about the axis of the head 36 is virtually precluded because spaced parts of the unitary bracket 70 are affixed to the socket structure 21. Of course, the points of attachment also center the bracket 70.

A connecting clamp 79 similar to the clamp 48 is provided for the ground conductor. This clamp 79 has an apertured end bent transversely, as at 81 (FIG. 7), for fastening by the nut 82.

The encapsulating housing 26 is provided after the bracket 70 is secured and the connections established. Portions of the encapsulating housing 26 overlie the base flange 38 of the shell 28, and thus moisture protection is provided (FIG. 5).

The cover mounting flange 90 accommodates a gasket 92. The screws 68 pass through the apertures in the base flange 90 and into the housing 26. The mounting bracket 70 being located definitely with respect to the socket head, it is a simple matter to find the blind holes 86. The mounting screws 68 pass into the encapsulating material and to the holes 86 at areas remote from the socket proper. No seal problem is created. The cover 64 is grounded by screws 68, bracket 70, and ground clamp 79 independently of the covering shell 28. The cover 64 has a biased closure 94 (FIG. 3) provided with a resilient element 96 that engages the opening of the closure to establish a seal when the socket is not in use.

Figure 9:
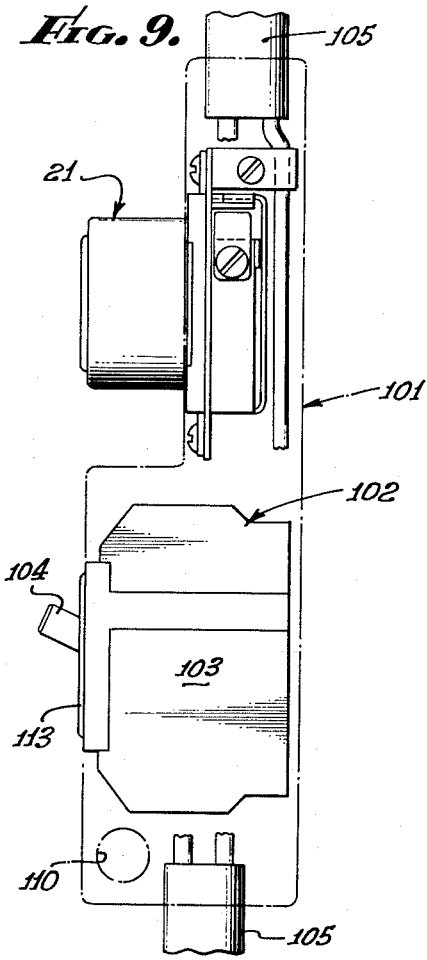
FIG. 9 is a side elevation of the device shown in FIG. 8.

In FIGS. 8 and 9, a single encapsulating housing 101 is provided for the socket 21 and a circuit breaker 102 located in tandem. The circuit breaker 102 shown in this example is a standard part. It is intended primarily to be inserted into an electrical box, but it is conveniently used in the present organization.

The circuit breaker 102 actually is of dual nature, a common housing 103 of relatively hard plastic being provided for two separate side-by-side circuit sections. One side of the circuit breaker is inserted into one circuit by the aid of terminals 117 and 119 at opposite ends of the device 102. The other side is inserted into another circuit by the aid of symmetrically located terminals 118 and 120. Two lands 112 and 113 of the housing 103 extend between the terminals for the circuit sections. Normally these lands interfit openings in face plates covering electrical boxes, and provide access for manual reset switches projecting therefrom. In this instance, a common toggle switch 104, extending from one of the lands 112, trips when either of the two circuits is overloaded. The switch 104 is operative to reset the opened circuits.

Both lands are accessible at openings in the encapsulating housing.

The unitary structure is easily formed. A four-conductor cable 105 has its jacket removed along an intermediate section thereof, exposing the four conductors 106, 107, 108 and 109. The conductors 106, 107, 108 and 109 are spread apart to form a loop within which the socket 21 and circuit breaker 102 in tandem are located. After appropriate electrical-mechanical connections (not shown) as in the previous form are made from the conductors 106, 107, 108 and 109 to the circuit breaker 102 and the socket 21, the parts are positioned in a mold so that the unitary encapsulating casing 101 encloses the parts as well as the cable jacket ends.

A core forms a through opening 110 adjacent one end (in this instance, at the circuit breaker end) through which a rod 111 or similar device may be passed for locating the apparatus at a desired level in one floor of a multiple-floor structure.

The lands 112 and 113 serve as a means for locating the entire circuit breaker 102 in a mold cavity. The encapsulating material 101 extends to the base of the lands 112 and 113, as shown in FIG. 9.

Covers (not shown), similar to those previously described, are provided for the socket as well as the circuit breaker. If desired, the conductors 106—109 can be placed all on one side or to the rear of the socket and circuit breaker.

Figure 10:
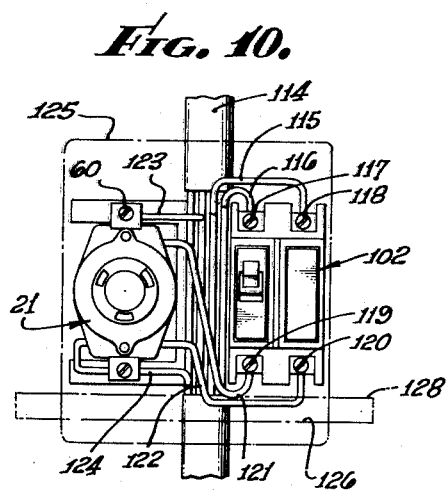
FIGS. 10 and 11 are diagrammatic views, each illustrating another relative arrangement of the overload device and the socket.

In FIG. 10, the circuit breaker 102 and the socket 21 are located in side-by-side relationship. The cable 114 passes between the socket and the circuit breaker 102. The jacket of the cable 114 is cut away at the area between the socket 21 and the circuit breaker 102 so that appropriate connections may be made. Electrical-mechanical connections similar to those described previously are, in this instance, diagrammatically illustrated. Thus, leads 115 and 116 extend from those two of the conductors of the cable 114 between which the high voltage is applied. The leads 115 and 116 connect respectively to terminals 117 and 118 of the circuit breaker. Terminals 119 and 120 of the circuit breaker connect respectively, by the aid of leads 121 and 122, to terminals of the socket 21. A ground wire 123 is connected to the bracket ear 60 at one end and the ground conductor of the cable 114 at the other end. A lead 124 connects directly between the neutral conductor of the cable 114 and the corresponding terminal of the socket 21.

The socket cable and circuit breaker 102 are together placed in a mold whereby a generally rectangular encapsulating housing 125 is formed. This housing also provides a through opening 126 for a rod 128 or the like.

Figure 11:
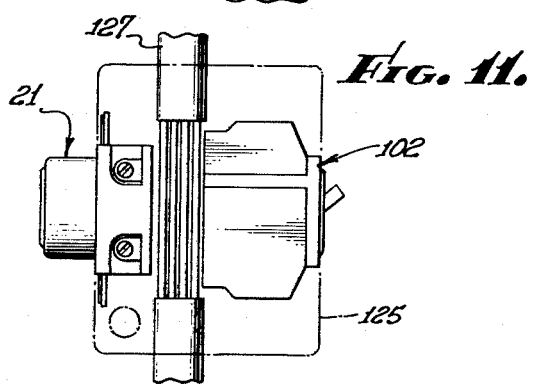

In the form illustrated in FIG. 11, the socket 21 and circuit breaker 102 are placed back to back, and the cable 127, as in the form illustrated in FIG. 10, extends between them.

Electrical-mechanical connections similar to those described previously are provided but not shown. Weather-proof covers (not shown) are also provided in the FIG. 10 and FIG. 11 forms.

The inventor claims:

1. In an electrical riser cable structure for providing temporary power to a multiple-floor building structure: a cable having a series of conductors; a series of takeoff connectors secured to the cable at spaced intervals, the spacing between the connectors being at least as great as the spacing of the floors of said building structure; said connectors each having through apertures for passage of a rod or the like whereby each connector may be suspended at an aperture in the corresponding floor.

2. In an electrical riser cable structure for providing temporary power to a multiple-floor building structure: a cable having a series of conductors; a series of takeoff connectors secured to the cable at spaced intervals, the spacing between the connectors being at least as great as the spacing of the floors of said building structure; said connectors each having as a part thereof provisions for individual suspension at an aperture in the corresponding floor.

References Cited in the file of this patent

UNITED STATES PATENTS

| | | |
|---|---|---|
| 426,127 | Kintner | Apr. 22, 1890 |
| 473,932 | Kintner | May 3, 1892 |
| 2,226,332 | Bacci | Dec. 24, 1940 |
| 2,390,192 | St. Clair | Dec. 4, 1945 |
| 2,713,082 | Hubbell | July 12, 1955 |
| 2,771,501 | Despard | Nov. 20, 1956 |

FOREIGN PATENTS

| | | |
|---|---|---|
| 618,701 | Great Britain | Feb. 25, 1949 |